United States Patent
Fisch

(10) Patent No.: US 8,912,842 B2
(45) Date of Patent: Dec. 16, 2014

(54) STABILIZATION OF AN OUTPUT CURRENT OF A CURRENT SUPPLY

(71) Applicant: Minebea Co., Ltd., Nagano (JP)

(72) Inventor: Josef Fisch, Petersberg (DE)

(73) Assignee: Minebea Co., Ltd, Miyota-Machi, Kitasaku-Gun, Nagano (JP)

( * ) Notice: Subject to any disclaimer, the term of this patent is extended or adjusted under 35 U.S.C. 154(b) by 0 days.

(21) Appl. No.: 13/920,841

(22) Filed: Jun. 18, 2013

(65) Prior Publication Data

US 2014/0028383 A1  Jan. 30, 2014

(30) Foreign Application Priority Data

Jul. 24, 2012  (DE) .......................... 10 2012 106 712

(51) Int. Cl.
  *G05F 1/10*  (2006.01)
  *G05F 3/02*  (2006.01)
(52) U.S. Cl.
  CPC *G05F 3/02* (2013.01); *Y02B 70/126* (2013.01)
  USPC ............................ 327/540; 327/538; 323/312
(58) Field of Classification Search
  None
  See application file for complete search history.

(56) References Cited

U.S. PATENT DOCUMENTS

| 7,323,851 | B2 * | 1/2008 | Markowski | 323/222 |
|---|---|---|---|---|
| 7,595,686 | B2 * | 9/2009 | Maksimovic et al. | 327/540 |
| 8,077,490 | B1 * | 12/2011 | Prodic et al. | 363/65 |
| 8,344,716 | B2 * | 1/2013 | Kenly et al. | 323/283 |
| 8,395,365 | B2 * | 3/2013 | Latham et al. | 323/283 |
| 8,488,344 | B2 * | 7/2013 | Kono et al. | 363/37 |
| 2006/0256560 | A1 * | 11/2006 | Okura | 362/265 |
| 2008/0288201 | A1 * | 11/2008 | Oettinger et al. | 702/109 |
| 2010/0064124 | A1 * | 3/2010 | Rinne et al. | 713/1 |
| 2010/0213856 | A1 * | 8/2010 | Mizusako | 315/158 |
| 2011/0071700 | A1 * | 3/2011 | Beck et al. | 700/298 |
| 2012/0205973 | A1 * | 8/2012 | McCaslin et al. | 307/18 |
| 2013/0268219 | A1 * | 10/2013 | Malek et al. | 702/60 |

OTHER PUBLICATIONS

Y.Zhou, et al; "A Remaining Useful Life Prediction Method Based on Condition Monitoring for LED Driver"; 978-1-4577-1911-0/12/$26.00 © 2012 IEEE; 2012 Prognostics & System Health Management Conference (PHM-2012 Beijing); MU3086 (5 pgs).
K.M.Tsang, et al; "Adaptive Control of Power Factor Correction Converter Using Nonlinear System Identification"; © IEE, 2005; IEEE Proc online No. 20045058, doi:10-1049/ip-epa: 20045058; .-Electr. Power Appl., vol. 152, No. 3, May 2005, pp. 627-633.

* cited by examiner

*Primary Examiner* — Thomas J Hiltunen
(74) *Attorney, Agent, or Firm* — Grossman, Tucker, Perreault & Pfleger, PLLC

(57) ABSTRACT

The invention provides a device for stabilizing an effective value of an output current of a converter. The device comprises the following:
  an input to receive an input voltage x of the converter,
  a memory in which a first set of polynomial coefficients a, b, c; $k_j$ is stored,
  a processor that is coupled to the input and the memory and is set up so as to determine a current correction y as a polynomial function with the stored first set of polynomial coefficients a, b, c; $k_j$ as a function of the received input voltage x, and
  a power stage that is coupled to the processor to receive the current correction y and set up to modify the effective value of the output current as a function of the current correction y.

12 Claims, 2 Drawing Sheets

STABILIZATION OF AN OUTPUT CURRENT OF A CURRENT SUPPLY

FIELD

Figure 1:
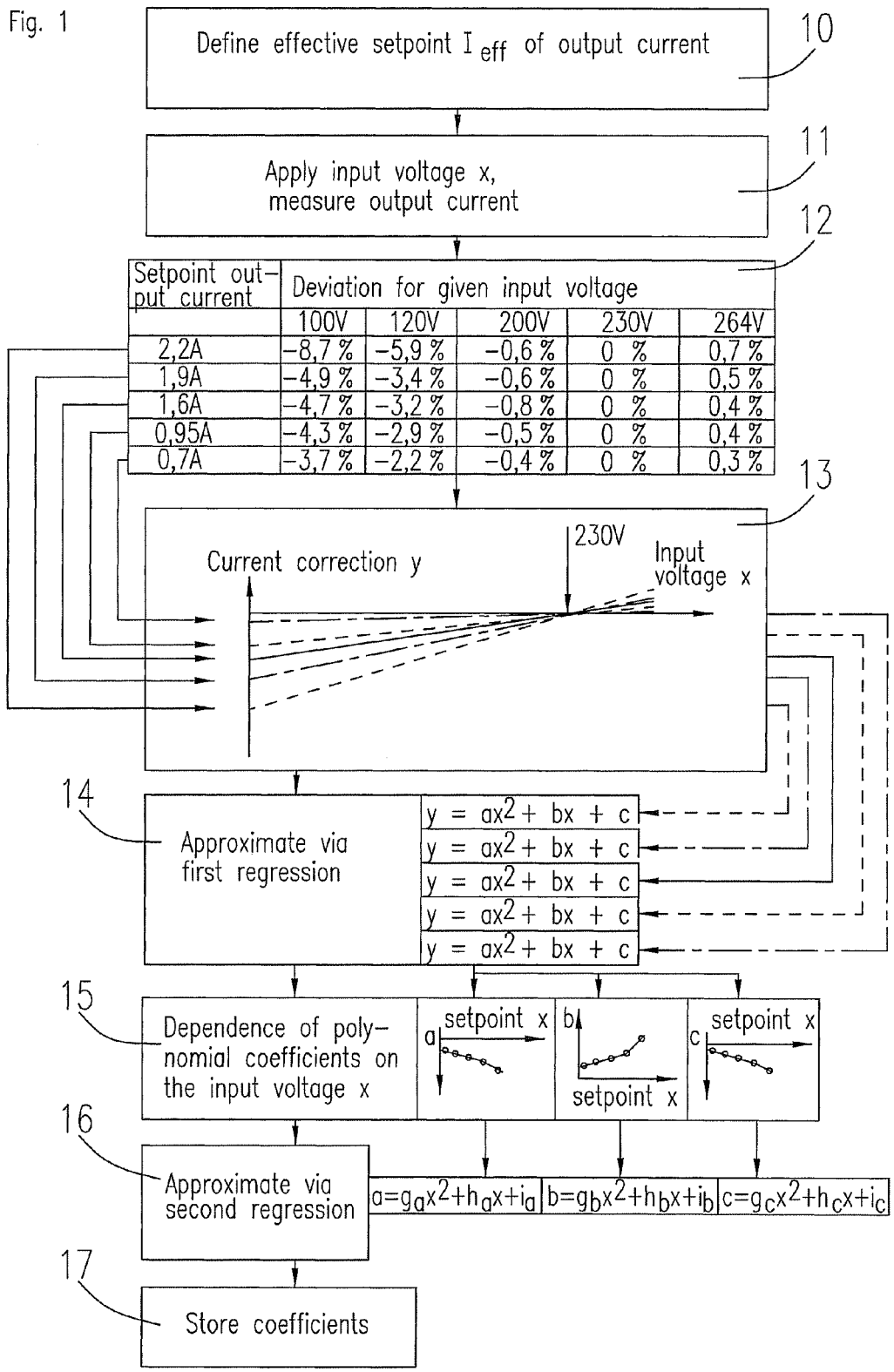

The invention relates to a device and a method for stabilizing an effective value of an output current of a power supply, particularly a converter, such as a flyback converter. The converter may be single or multistage. The converter maybe designed, for example, to supply LEDs and, alternatively or additionally, have a power output of between 10 W and 500 W, preferably between 20 W and 100 W and particularly preferably between 30 W and 50 W.

BACKGROUND

For power converters that provide an output current at their output, power factor correction (PFC) is normally used. The current generated at the output of the converter has a DC component and an AC component. The effective value of the output current should correspond within prescribed tolerances to a setpoint programmed in the converter. It should be noted here, however, that the effective value of the output current emitted at the output depends on the input voltage of the converter. This is why the accuracy of the output current has to be specified in greater tolerances or the overall converter circuit has to be specified for only low input voltage ranges.

To enable the given setpoint output current to be emitted at the output, a control strategy is used that regulates to the maximum value of the output current. However, particularly for a single-stage flyback converter topology, the amplitude of the AC component of the output current is strongly dependent on the input AC voltage.

Stabilizing the output current of the converter makes particular sense if the converter supplies power to one or more lamps, for example, one or more LEDs. Fluctuations in the power supply of the LEDs cause variations in brightness which could have an irritating effect for the observer.

It is the object of the invention to provide stabilization of the effective value of the output current of a converter.

SUMMARY

In a first aspect, the invention provides a device for stabilizing an effective value of an output current of a converter, wherein the device comprises the following:
- an input to receive an input voltage x of the converter,
- a memory in which a first set of polynomial coefficients a, b, c; $k_j$ is stored,
- a processor that is coupled to the input and the memory and is set up so as to determine a current correction y as a polynomial function with the stored first set of polynomial coefficients a, b, c; $k_j$ as a function of the received input voltage x, and
- a power stage that is coupled to the processor to receive the current correction y and set up to modify the effective value of the output current of the converter as a function of the current correction y.

The device according to the invention stabilizes the effective value of the output current in that it determines the active input voltage x of the converter and, using a polynomial approximation based on the determined input voltage x, determines a current correction y. The effective value of the output current is then modified as a function of the current correction y. The power stage preferably modifies the effective value of the output current in that it modifies a DC component of the output current, i.e. increases or decreases it. The power stage may comprise a current amplifier. In several embodiments, the power stage is integrated in a power stage of the converter.

According to one embodiment, the memory is detachably coupled to the processor. The memory may, alternatively or additionally, be disposed separately from the processor and the power stage in a memory housing. These embodiments make it possible to disconnect the memory from the remaining components of the device. For example, the memory of the device may be removed and connected to a PC, a tablet computer or a smartphone so as to program it as described in more detail below. Provision can also be made for the processor and the power stage to be disposed in a further housing. The memory housing and the further housing can be mechanically and/or electrically coupled to one another via an interface, such as a plug/socket connection.

Irrespective of whether the memory is detachably coupled to the processor or not, the memory may be connected or designed to be connected to a wireless interface, such as ZigBee, wireless LAN, Bluetooth or Bluetooth low energy to allow comfortable programming of the memory. This particularly allows automatic programming via a PC, for example, of a plurality of converters without the need for accessibility.

In one embodiment, on determining the current correction y, the processor takes into account terms of up to the second or third order in the input voltage x. Through the limitation to terms of the second or third order, the evaluation of the polynomial function is accelerated. Furthermore, a quadratic or cubic approximation of the dependence of the current correction y on the input voltage x is adequate in order to sufficiently stabilize the effective value of the output current. In several embodiments, when the current correction y is being determined, at least terms of the second order are taken into account in the input voltage x. This produces more exact stabilization than a simple linear calculation of the current correction y.

According to one embodiment, the current correction y provides a relative correction of the effective value of the output current. In this embodiment, the current correction y particularly describes a percentage by which the effective value of the output current is increased or decreased by the power stage. In other embodiments, the current correction y may provide an absolute correction of the effective value of the output current, i.e. state the difference by which the effective value of the output current is to be increased or decreased in ampere.

In one embodiment, the memory has an interface for connection to a computer, such as a USB terminal. Alternatively or additionally, the memory may have an interface such as Thunderbolt, FireWire or a cordless interface according to an infrared or wireless standard such as wireless LAN, Bluetooth, Bluetooth low energy or ZigBee. In this way, the polynomial coefficients a, b, c; $k_j$ can be written by the computer into the memory. This is particularly advantageous if the effective setpoint of the output current of the converter is adjustable. In this way the polynomial coefficients a, b, c; $k_j$ can be determined using the computer and written in the memory when the effective setpoint of the output current is set or changed.

Furthermore, the invention provides a method for programming the memory of a device of the kind mentioned above. The method comprises the following:
(a) receiving a specification of an effective setpoint $I_{eff}$ of an output current of a converter,
(b) determining a first set of polynomial coefficients a, b, c; $k_j$ as polynomial functions of the effective setpoint of the output current using predetermined second sets of polynomial coefficients $g_a$, $h_a$, $i_a$, $g_b$, $h_b$, $i_b$, $g_c$, $h_c$, $i_c$; $p_{ij}$,
(c) storing the first set of polynomial coefficients a, b, c; $k_j$ in the memory.

Using the said method, the polynomial coefficients a, b, c; $k_j$, which describe the current correction y of the output current as a function of the input voltage x of the converter, can be calculated subject to the set effective setpoint of the output current. Here, it is particularly preferable if this method is carried out by a computer to which the memory of the device is connected.

According to one embodiment, for determining the first set of polynomial coefficients a, b, c; $k_j$, the polynomial functions have terms up to an equal order in the effective setpoint of the output current. The polynomial functions used for determining the first set of polynomial coefficients a, b, c; $k_j$ may, in several embodiments, have terms of up to the second or third order in the effective setpoint of the output current. An approximation up to the second or third order is generally adequate in order to adjust the first set of coefficients a, b, c; $k_j$ to another effective setpoint of the output current. In other embodiments, the polynomial functions for determining the first set of polynomial coefficients a, b, c; $k_j$ may also have terms of a higher order. Since this method is preferably run on a computer, the computing capacity required for this does not play an important part. It is preferable if the polynomial functions have at least terms of the second order in the effective setpoint of the output current.

In a further aspect, the invention provides a programming device for programming the memory of a device of the kind described above, wherein the programming device has an interface to receive a specification of an effective setpoint of the output current of the converter and a processor for determining a first set of polynomial coefficients a, b, c; $k_j$ as polynomial functions of the received effective setpoint of the output current using predetermined second sets of polynomial coefficients $g_a$, $h_a$, $i_a$, $g_b$, $h_b$, $i_b$, $g_c$, $h_c$, $i_c$; $p_{ij}$. The processor is connected to an output that can be coupled to the memory of the device for storing the first set of polynomial coefficients a, b, c; $k_j$ in the memory of the device. The programming device thus allows the above-described method for programming the memory to be carried out.

In a further aspect, the invention provides a method for determining second sets of polynomial coefficients $g_a$, $h_a$, $i_a$, $g_b$, $h_b$, $i_b$, $g_c$, $h_c$, $i_c$; $p_{ij}$, as used above. The method comprises the following:
  (a1) adjusting a converter to an effective setpoint $I_{eff}$ of an output current of the converter at a predetermined setpoint input voltage,
  (a2) for each group of input voltages:
    (a21) applying the input voltage to the converter,
    (a22) measuring an actual effective value of the output current,
    (a23) determining any deviation of the measured actual effective value of the output current from the effective setpoint of the output current,
  (a3) carrying out a first regression of the deviation as a function of the input voltage for determining a first set of polynomial coefficients a, b, c; $k_j$,
  (a4) repeating the steps (a1) to (a3) for a group of effective setpoints of the output current for determining a group of polynomial coefficients for each of the polynomial coefficients a, b, c; $k_j$ of the first set of polynomial coefficients,
  (a5) carrying out a second regression for each polynomial coefficients a, b, c; $k_j$ of the first set of polynomial coefficients as a function of the effective setpoint of the output current for determining a second set of polynomial coefficients g, h, i; $p_{ij}$ for each of the polynomial coefficients a, b, c; $k_j$ of the first set.

Two different regressions are thus carried out in order to determine the polynomial coefficients g, h, i; $p_{ij}$. Initially, for a predetermined setpoint output current, the change in the actual output current is determined as a function of the input voltage of the converter. For the dependence of the actual output current on the input voltage, a first regression is carried out, which describes the current correction y, i.e. the difference or the ratio between the setpoint output current and the actual output current, as a function of the input voltage. Whenever at this point or below, a setpoint output current and an actual output current are mentioned, this refers to the respective effective setpoint or the actual effective value of the output current.

Through the second regression, the dependence of the polynomial coefficients a, b, c; $k_j$ on the set setpoint output current is approximated through a polynomial function having coefficients g, h, i; $p_{ij}$.

In a preferred embodiment, the method for determining the second sets of polynomial coefficients $g_a$, $h_a$, $i_a$, $g_b$, $h_b$, $i_b$, $g_c$, $h_c$, $i_c$; $p_{ij}$ includes the fact that the polynomial coefficients g, h, i; $p_{ij}$ and a, b, c; $k_j$ are stored in a computer application.

According to one embodiment, in the first and/or second regression, terms of up to the second or third order are taken into account. Such limitation to terms of up to the second or third order is generally adequate in order to approximate the said dependences. It is preferable if the first and second regression are at least quadratic, i.e. take into account terms of the second order.

In a further aspect the invention provides a method for stabilizing an effective value of an output current of a converter. The method comprises the following:
  (d) determining an active input voltage x of the converter,
  (e) determining a current correction y as a polynomial function with a predetermined first set of polynomial coefficients a, b, c; $k_j$ as a function of the received input voltage x and
  (f) modifying the effective value of the output current of the converter as a function of the current correction y.

Here, it is preferable if the polynomial function in step (e) takes into account terms of up to the second or third order in the input voltage x. In a preferred embodiment, the current correction y specifies a relative correction of the effective value of the output current.

In a further aspect, the invention provides a method that has steps (a), (b), (c), (d), (e) and (f).

According to a further aspect, the invention provides a computer-readable medium on which instructions are stored which, when they are executed by a computer, prompt the computer to carry out one of the above-mentioned methods.

In a further aspect, the invention provides a system that comprises a device of the kind described above and a computer-readable medium on which instructions are stored which, when they are executed by a computer, prompt the computer to carry out one of the above-mentioned methods.

According to a further aspect, the invention provides an electric power converter having a device of the kind described above.

SHORT DESCRIPTION OF DRAWINGS

Further characteristics and advantages of the invention are made explicit on the basis of the following description of preferred embodiments with reference to the enclosed figures. The figures show:
  FIG. 1 a procedure for determining the second sets of polynomial coefficients g, h, i,
  FIG. 2 a procedure to achieve stabilization of the output current and
  FIG. 3 a device according to an embodiment.

DESCRIPTION OF EMBODIMENTS

For stabilizing the output current of a converter, the invention takes into account that the actual effective value of the output current depends on the input voltage x of the converter. In order to set the desired effective setpoint of the output current, the actual effective value has to be modified in accordance with a current correction y. The current correction y thereby depends on the input voltage x of the converter. This dependence can be approximated using a polynomial function having coefficients a, b, c:

$$y = ax^2 + bx + c. \qquad (1)$$

Using equation (1), for each input voltage x, the optimum current correction y can be determined on the basis of previously determined and stored coefficients a, b, c. The invention further takes into account that the converter can be set to different effective setpoints $I_{eff}$ of the output current. However, the current correction y required for stabilizing the effective value of the output current is dependent on the set effective setpoint $I_{eff}$ of the output current. This can be expressed in equation (1) such that the coefficients a, b, c are dependent on the effective setpoint $I_{eff}$ of the output current. In order to take this dependence into account, the coefficients a, b, c of the equation (1) are each seen as functions of the effective setpoint $I_{eff}$ of the output current and likewise approximated using a polynomial function having second sets of polynomial coefficients g, h, i:

$$a = g_a I_{eff}^2 + h_a I_{eff} + i_a,$$

$$b = g_b I_{eff}^2 + h_b I_{eff} + i_b,$$

$$c = g_c I_{eff}^2 + h_c I_{eff} + i_c. \qquad (2)$$

Using the coefficients $g_a$, $h_a$, $i_a$, $g_b$, $h_b$, $i_b$, $g_c$, $h_c$, $i_c$, polynomial coefficients a, b, c can be determined for each chosen effective setpoint $I_{eff}$ of the output current. These are then used in order to determine a current correction y according to equation (1) as a function of the active input voltage x.

To simplify the depiction, in the equations (1) to (2) one quadratic approximation is assumed. However, the invention is not limited in this respect. In general, the current correction y can be approximated as a function of the input voltage x of the converter as a polynomial function of the nth order having a first set of n+1 polynomial coefficients $k_j$:

$$y = \sum_{j=0}^{n} k_j x^j. \qquad (1')$$

The polynomial coefficients $k_j$ in turn can be approximated as polynomial functions of the effective setpoint $I_{eff}$ of the output current of the mth order using n+1 of the second sets of coefficients $p_{ij}$:

$$k_j = \sum_{l=0}^{m} p_{ij} I_{eff}^l \text{ for } j = 0, \ldots, n. \qquad (2')$$

To simplify the depiction, in equation (2') each coefficient $k_j$ of the first set is approximated by a polynomial of the same order, namely the mth order. To determine the current correction y as a function of the input voltage x and the setpoint output current $I_{eff}$, then (n+1)*(m+1) coefficients have to be determined and stored. In the enclosed drawings and in the description below, for the sake of simplicity, the notation according to equations (1) and (2) is used in several places. However, the invention is not limited to the quadratic approximations given there.

For the sake of simplicity, equation (2) or (2') can be set in equation (1) or (1'). However, as will be described below, it is preferable if the calculation of the equation (1) or (1') is carried out by the device, which is coupled to the converter or integrated into it, whereas the calculation of the equations (2) or (2') is carried out by a computer or a programming device that writes the calculated first set of coefficients a, b, c; $k_j$ in the memory of the device before the device is put into operation.

FIG. 1 illustrates a method by means of which the second sets of polynomial coefficients g, h, i—or more general $p_{ij}$—can be determined.

In a first step 10, different effective setpoints of the output current are initially defined, for example, five different effective setpoints of the output current. It is expedient if these are defined such that they cover the setpoint output current range designated for future application. Subsequently, in step 11 for each of the defined setpoint output currents, the input voltage x of the converter is varied, i.e. for each of the defined setpoint output currents, a series of different input voltages x are applied consecutively. As an outcome of steps 10 and 11, a table in step 12 is produced that shows the deviation of the measured actual output current from the set setpoint output current as a function of the input voltage x for various setpoint output currents. The table determined in step 12 thus specifies, with an inverted plus/minus sign, the current correction y by which an actual output current of the converter has to be corrected so as to adjust to the desired setpoint output current (see step 13). Each of the generally non-linear curves shown in step 13 specifies the current correction y as a function of the input voltage x for a given setpoint output current.

In order to store the curves determined in step 13 in the device, they are approximated in step 14 using a regression. This approximation corresponds to the equations (1) and (1'). For example, for each setpoint output current, a first quadratic regression can be carried out, which results in the current correction y for this setpoint output current as a quadratic function of the input voltage x with a first set of polynomial coefficients a, b, c. The polynomial coefficients a, b, c of the first set are, however, also different for different setpoint output currents.

In step 15, the dependence of each of the polynomial coefficients a, b, c of the first set on the input voltage x is considered separately. In step 16, for each of the polynomial coefficients a, b, c, a second regression is carried out, so as to determine the dependence of the polynomial coefficients a, b, c of the first set as a polynomial function of the effective setpoint of the output current, see equations (2) and (2'). For a quadratic regression of the polynomial coefficients a, b, c as a function of the setpoint output current, for each coefficient a, b, c of the first set this results in a second set with three coefficients—$g_a$, $h_a$, $i_a$ for the coefficient a; $g_b$, $h_b$, $i_b$ for the coefficient b; $g_c$, $h_c$, $i_c$ for the coefficient c. The second sets of polynomial coefficients g, h, i are stored in step 17 in a computer application. For example, should the first and the second regression take into account terms of up to the second order, this results in nine polynomial coefficients g, h, i, that have to be determined and stored.

The method shown in FIG. 1, is carried out just once on designing and developing a converter. The second sets of polynomial coefficients g, h, i thereby determined are universal in this respect and are stored in a computer application that is, for example, supplied together with the device integrated in the converter as a system.

Figure 2:
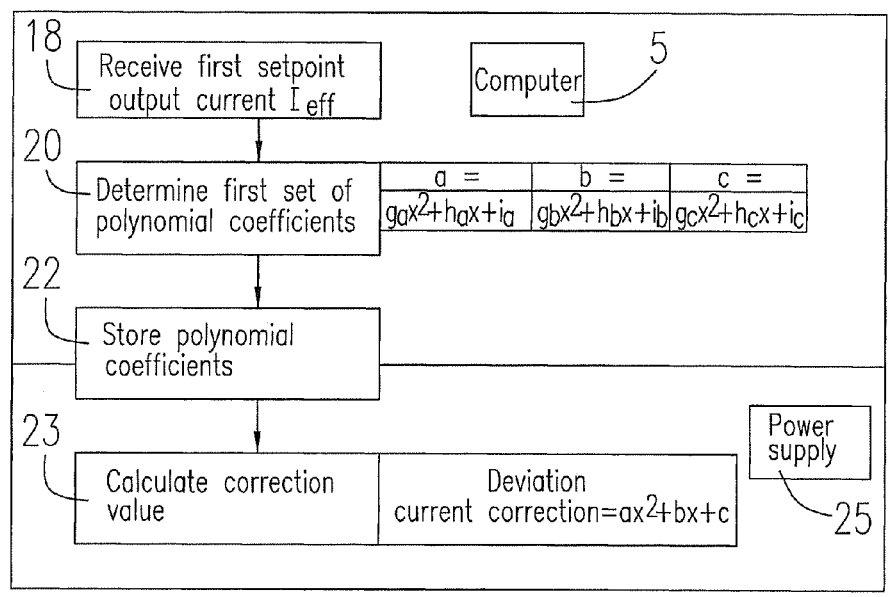

FIG. 2 illustrates a system according to an embodiment. A method is initially provided that runs on a computer and that can be used for stabilizing the output current of a power supply 25. Firstly, the user enters the desired effective setpoint of the output current that is received by the computer in step 18. On the basis of the entered setpoint output current, the computer determines in step 20 the first set of polynomial coefficients a, b, c using the second sets of polynomial coefficients g, h, i stored in the computer application according to equation (2) or (2'). The polynomial coefficients a, b, c calculated by the computer and the setpoint current are transferred by the computer in step 22 to the memory of the device and stored there. Through these method steps carried out up to this point in time, the coefficients a, b, c are defined for a fixed setpoint output current.

The memory can then be disconnected from the computer and coupled to the processor of the device. When the converter is in operation, the processor receives its input voltage x and in step 23 calculates on the basis of the polynomial coefficients a, b, c stored in the memory, a current correction y according to equation (1).

Figure 3:
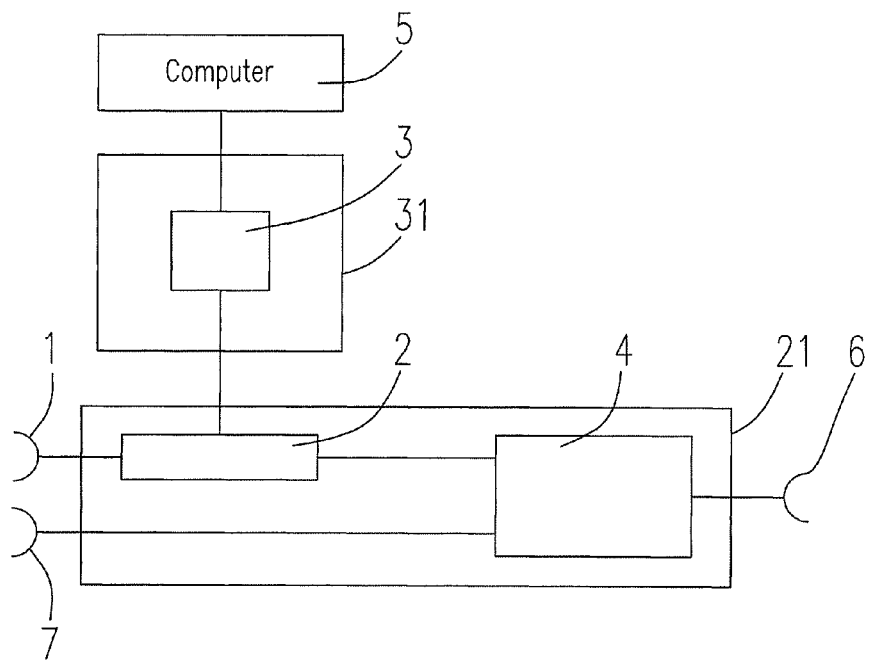

FIG. 3 illustrates the construction of a device according to an embodiment. The device has a processor 2 that is coupled to an input 1 of the device to receive an active input voltage x of the converter. The processor 2 is moreover coupled to a memory 3 in which polynomial coefficients a, b, c; $k_j$ are stored. On the basis of the received input voltage x as well as the polynomial coefficients a, b, c; $k_j$ stored in the memory 3, the processor 2 calculates a current correction y that it sends via a connection to a power stage 4 of the device. The power stage 4 modifies the output current of the converter received at a further input 7 of the device as a function of the current correction y received from the processor 2 and outputs a stabilized output current at the output 6 of the device.

The processor 2 and the power stage 4 are disposed in a common housing 21 that is designed separately from a memory housing 31 that accommodates the memory 3. The memory 3 is detachably coupled to the processor 2. Between the housing 21 and the memory housing 31, a plug/socket system can particularly be provided that allows both mechanical as well as electrical coupling.

Moreover, the memory 3 has a terminal for connection to a computer 5. In this way, the memory 3 can first be connected to the computer 5 before the device is put into operation. The user can then set the desired setpoint output current of the converter using the computer 5. The computer calculates as a function of the entered setpoint output current, a first set of polynomial coefficients a, b, c; $k_j$ according to equation (2) or (2') and stores this in the memory 3. Subsequently, the connection between the memory 3 and the computer 5 can be broken and the memory 3 can be coupled to the processor 2, so that the coefficients a, b, c; $k_j$ stored in the memory 3 can be called up by the processor 2.

The illustrated embodiments may be modified. In particular, the device may form a part of the converter. For example, the power stage may include an amplifier stage. In several embodiments, the power stage can be integrated in a PFC stage of the converter.

IDENTIFICATION REFERENCE LIST 1, 7 Input
2 Processor
21 Housing
25 Power supply
3 Memory
31 Memory housing
4 Power stage
5 Computer
6 Output
10-18, 20, 22, 23 Method steps

What is claimed is:

1. A device for stabilizing an effective value of an output current of a converter, wherein the device comprises:
    an input to receive an input voltage x of the converter,
    a memory in which a first set of polynomial coefficients a, b, c; $k_j$ is stored,
    a processor that is coupled to the input and the memory and is set up so as to determine a current correction y as a polynomial function with the stored first set of polynomial coefficients a, b, c; $k_j$ as a function of the received input voltage x, wherein the first set of polynomial coefficients a, b, c; $k_j$ is determined as a polynomial function of an effective setpoint of the output current using a predetermined second set of polynomial coefficients $g_a$, $h_a$, $i_a$, $g_b$, $h_b$, $i_b$, $g_c$, $h_c$, $i_c$; $p_{ij}$, and
    a power stage that is coupled to the processor to receive the current correction y and set up to modify the effective value of the output current as a function of the current correction y.

2. A device according to claim 1 wherein the memory is detachably coupled to the processor.

3. A device according to claim 1, wherein the memory is disposed separately from the processor and the power stage in a memory housing.

4. A device according to claim 1, wherein the processor, on determining the current correction y, takes into account terms of up to the second or third order in the input voltage x.

5. A device according to claim 1, wherein the current correction y specifies a relative correction of the effective value of the output current.

6. A device according to claim 1, wherein the memory has an interface for connection to a computer.

7. A programming device for programming a memory of a device for stabilizing an effective value of an output current of a converter, wherein the device comprises:
    an input to receive an input voltage x of the converter,
    a memory in which a first set of polynomial coefficients a, b, c; $k_j$ is stored,
    a processor that is coupled to the input and the memory and is set up so as to determine a current correction y as a polynomial function with the stored first set of polynomial coefficients a, b, c; $k_j$ as a function of the received input voltage x, and
    a power stage that is coupled to the processor to receive the current correction y and set up to modify the effective value of the output current as a function of the current correction,
wherein the programming device has an interface for receiving a specification of an effective setpoint of an output current of a converter and a processor for determining a first set of polynomial coefficients a, b, c; $k_j$ as polynomial functions of the received effective setpoint of the output current using predetermined second sets of polynomial coefficients $g_a$, $h_a$, $i_a$, $g_b$, $h_b$, $i_b$, $g_c$, $h_c$, $i_c$, $p_{ij}$, wherein the processor is connected to an output that can be coupled to the memory of the device for storing the first set of polynomial coefficients a, b, c; $k_j$ in the memory of the device.

8. A programming device according to claim 7, wherein the polynomial functions for determining the first set of polynomial coefficients a, b, c; $k_j$ have terms of up to an equal order.

9. A programming device according to claim 7, wherein the polynomial functions for determining the first set of polynomial coefficients a, b, c; $k_j$ have terms of up to the second or third order in the effective setpoint of the output current.

10. A computer-readable medium on which instructions are stored which, when they are executed by a computer, prompt the computer to carry out a method for determining second sets of polynomial coefficients $g_a$, $h_a$, $i_a$, $g_b$, $h_b$, $i_b$, $g_c$, $h_c$, $i_c$; $p_{ij}$, wherein the method comprises:

(a1) adjusting a converter to an effective setpoint $I_{eff}$ of an output current of the converter at a predetermined setpoint input voltage, (a2) for each group of input voltages:

(a21) applying the input voltage to the converter, (a22) measuring an actual effective value of the output current, (a23) determining any deviation of the measured actual effective value of the output current from the effective setpoint of the output current, (a3) carrying out a first regression of the determined deviation as a function of the input voltage for determining a first set of polynomial coefficients a, b, c; $k_j$, (a4) repeating steps (a1) to (a3) for each value of a group of effective setpoints of the output current for determining a group of polynomial coefficients for each of the polynomial coefficients a, b, c; $k_j$ of the first set of polynomial coefficients, (a5) carrying out a second regression for each polynomial coefficient a, b, c; $k_j$ of the first set of polynomial coefficients as a function of the effective setpoint of the output current for determining a second set of polynomial coefficients g, h, i; $p_{ij}$ for each of the polynomial coefficients a, b, c; $k_j$ of the first set.

11. A computer-readable medium according to claim 10, wherein the polynomial coefficients g, h, i; $p_{ij}$ and a, b, c; $k_j$ are stored in a computer application.

12. A computer-readable medium according to claim 10, wherein for the first and/or second regression only terms of up to the second or third order are taken into account.

* * * * *

UNITED STATES PATENT AND TRADEMARK OFFICE
CERTIFICATE OF CORRECTION

PATENT NO. : 8,912,842 B2  Page 1 of 1
APPLICATION NO. : 13/920841
DATED : December 16, 2014
INVENTOR(S) : Josef Fisch It is certified that error appears in the above-identified patent and that said Letters Patent is hereby corrected as shown below:

In the Claims,

In column 8, line 22, in claim 1, delete "$p_{ij}$," and insert -- $p_{lj}$, --, therefor.

In column 8, line 61, in claim 7, delete "$p_{ij}$," and insert -- $p_{lj}$, --, therefor.

In column 9, line 9, in claim 10, delete "$p_{ij}$," and insert -- $p_{lj}$, --, therefor.

In column 10, line 13, in claim 10, delete "$p_{ij}$" and insert -- $p_{lj}$ --, therefor.

In column 10, line 15, in claim 11, delete "$p_{ij}$" and insert -- $p_{lj}$ --, therefor.

Signed and Sealed this
Nineteenth Day of May, 2015

Michelle K. Lee
*Director of the United States Patent and Trademark Office*